Sept. 25, 1934.    R. CHILTON    1,974,804
CRANK CASE VENTING SYSTEM
Filed Jan. 14, 1932
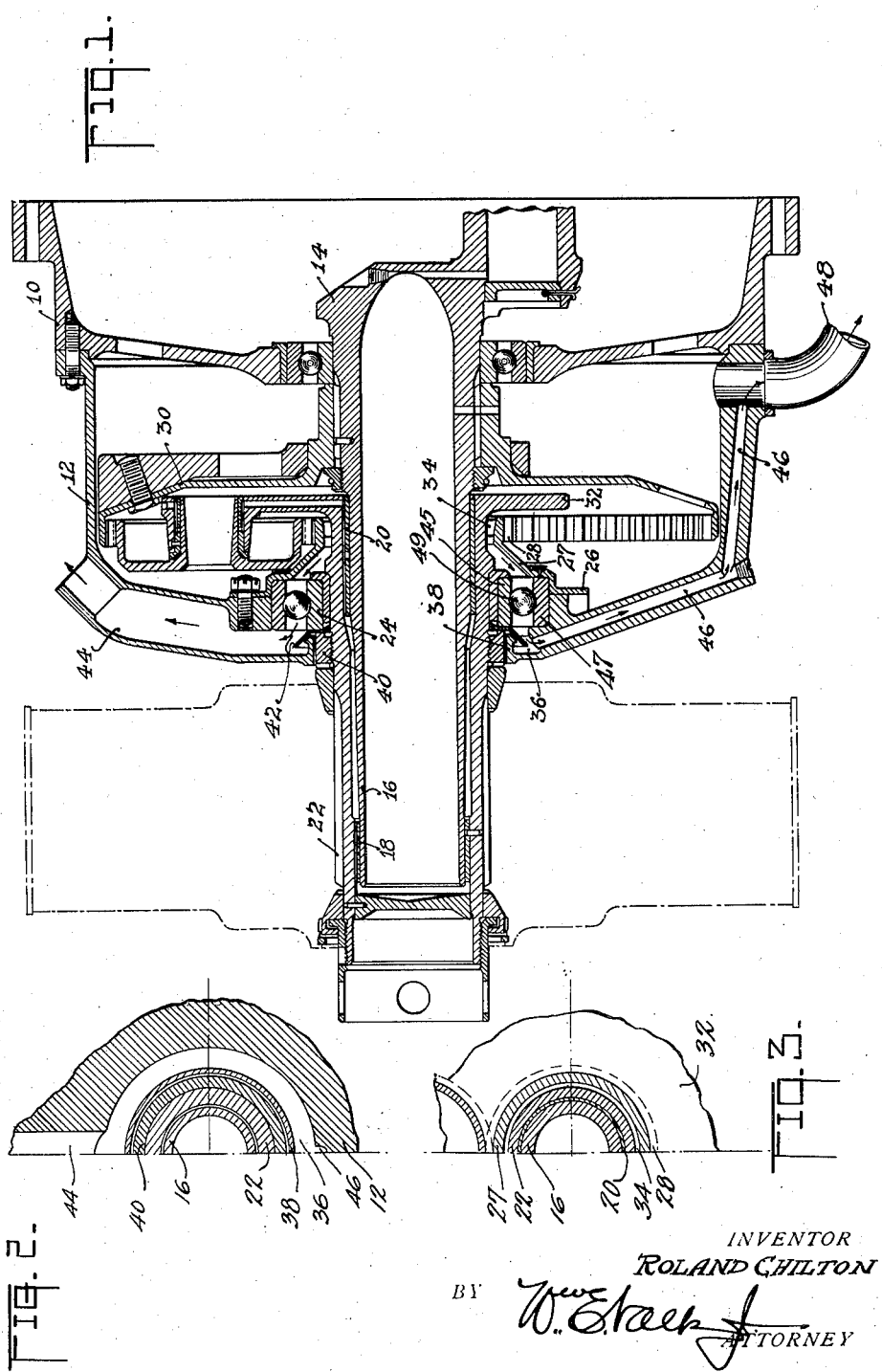
INVENTOR
ROLAND CHILTON
BY
ATTORNEY Patented Sept. 25, 1934

1,974,804

UNITED STATES PATENT OFFICE 1,974,804

CRANK CASE VENTING SYSTEM

Roland Chilton, Ridgewood, N. J., assignor to Wright Aeronautical Corporation, Paterson, N. J., a corporation of New York Application January 14, 1932, Serial No. 586,600

4 Claims. (Cl. 121—194)

My invention relates to improved means for venting the housings of lubricated mechanisms and more particularly to crankcase venting of internal combustion engines.

Much trouble has been experienced with oil leakage through the breathers or vents of the crankcases of radial aircraft engines due (1) to the extreme compactness of the crankcases (2) to the violent air pulsations set up by the pistons and counterweights, and (3) to the relatively large volume of piston leakage which must be provided for. It is the usual practice in radial aircraft engines to vent the nose end of the crankcase because this particular part of the crankcase contains the least amount of agitated oil. Notwithstanding such precaution, breather leakage is the rule rather than the exception, especially in geared engines where additional agitation or splashing occurs at the nose or forward crankcase end where the gear train is encased.

In my copending application, Serial No. 539,836, filed May 31, 1931, a satisfactory form of crankcase venting arrangement is disclosed. Due to the fact that the vapors escape from the center of rotation along the axis of the crankshaft, little or no oil leakage can occur. Centrifugal force within the crankcase tends to effectively separate the vapor and the oil. Such system, however, has its disadvantages since, due to propeller interference, it is difficult to connect a pipe to the vent or breather as is often desired in order to bring the ultimate outlet to a point where the condensation which occurs will not be objectionable. The principal object, therefore, of the present invention is to provide a vent or breather at or near the center of rotation of the crankshaft which may be piped up to any convenient point of ultimate outlet, such, for instance, as the carburetor air intake.

Other objects and advantages of the invention will be hereinafter set forth.

Fig. 1 is a longitudinal section through the nose casing of a geared radial engine; and Figs. 2 and 3 are, respectively, sections through the passages 36 and 34 of Fig. 1.

In the drawing, wherein there is disclosed (Fig. 1) a longitudinal section through the nose casing of a geared radial engine, 10 designates the crankcase and 12 the casing nose. The crankshaft 14 of the engine is extended at 16 to form journals for the support of the bearings 18 and 20 of the propeller shaft 22, said shaft being located in the nose housing 12 by the propeller thrust bearing 24. This bearing may conveniently be secured by the flange 26 of the fixed gear 28 of the planetary gear indicated in general at 30. The particular form of planetary gear is not a part of the present invention. It need not be described, therefore, in greater detail except to point out that the propeller shaft 22 is provided with a flange 32 which comprises the planet supporting member, and that at the point of juncture of the shaft and flange there is provided an annular breather opening 34 within the fixed gear 28. The details of the planetary gear system are disclosed in a co-pending application filed concurrently herewith, Serial Number 586,601.

Outside of the thrust bearing 24 there is formed in the nose housing 12 an annular space 36, the wall of which is preferably inturned at 33 around the bearing nut 40, a finger 42 being interposed between the nut 40 and the bearing 24 to prevent oil leakage at this point. Communicating with the annulus 36 is the breather passage 44 which may be piped up to any convenient point, the passage 44 in the present embodiment extending radially upward from the annulus 36.

It will now be seen that ample area for the escape of crankcase vapor is provided by the annular space 34 under the fixed gear 28. The hub 27 of the fixed gear 28, by its rearward extension from the flange 26 attached to the nose casing 12, forms a baffle to limit the flow of oil and air through the annular space 34. Any vapor entering here must do so against the centrifugal action imparted by the rotating shaft 22 and flange 32, the latter acting as a flinger whereby the heavier particles will be separated from the lighter vapor which will escape through the bearing 24 as indicated by the arrows. It will be noted that the bearing 24 is of the anti-friction type, utilizing an inner bearing race 45 mounted on the propeller shaft 22, and an outer bearing race 47 mounted in the nose casing 12. The balls 49 or equivalent rollers, form the balance of the bearing 24, and by the interposition of such balls 49 between the outer race 47 and the inner race 45, an annular space or passage is formed therebetween, which space, normally occurring in any ball or roller bearing of similar type, is given a new use in making it part of the breathing path for the engine.

As an additional precaution against the accumulation of oil in the annulus 36 a drain connection 46 may be employed. Preferably the drain connection 46 is in communication with the main drain 48 by means of which the used oil from the casing is scavenged.

It is to be understood that the above described embodiment of the invention is for the purpose of illustration only, and various changes may be made therein without departing from the spirit and scope of the invention.

I claim as my invention:

1. In an engine, a casing, a bearing race mounted therein, a shaft projecting through said bearing race in annularly spaced relation thereto, and an annular baffle carried by said casing and extending inwardly from said race in annularly spaced relation to said shaft, the annular space between said shaft and said baffle and outer race, respectively, forming a vent passage for said casing.

2. In an engine, in combination, a casing, a bearing race in said casing, a shaft projecting through said bearing race in annularly spaced relation thereto, a substantially cylindrical gear hub fixed to said casing and extending inwardly in annularly spaced relation to said shaft, a planet gear holding plate projecting outwardly from said shaft, said plate being spaced from the inner end of said gear hub, a gear carried by said hub engageable with said planet gears, the annular space between said hub and said shaft, and between said bearing race and said shaft, forming a breathing passage for said engine.

3. In an engine having a shaft extending through a casing in annularly spaced relation thereto and having a plurality of spaced gears within said casing, said gears being spaced from said shaft, means for forming a labyrinth breathing passage between the interior of said casing and the outside air, said means including the spaces between said gears, the space between said shaft and said gears, and the annular space between said shaft and said casing.

4. In combination, a breathing system for an engine including a casing, a shaft borne therein in annularly spaced relationship thereto, and a reduction gear mechanism having a gear fixed to said casing and concentric to said shaft, said gear being annularly spaced from said shaft, the annular space between said gear and said shaft communicating with the annular space between said casing and said shaft to provide a breathing duct for the engine.

ROLAND CHILTON.